United States Patent Office 3,144,307
Patented Aug. 11, 1964

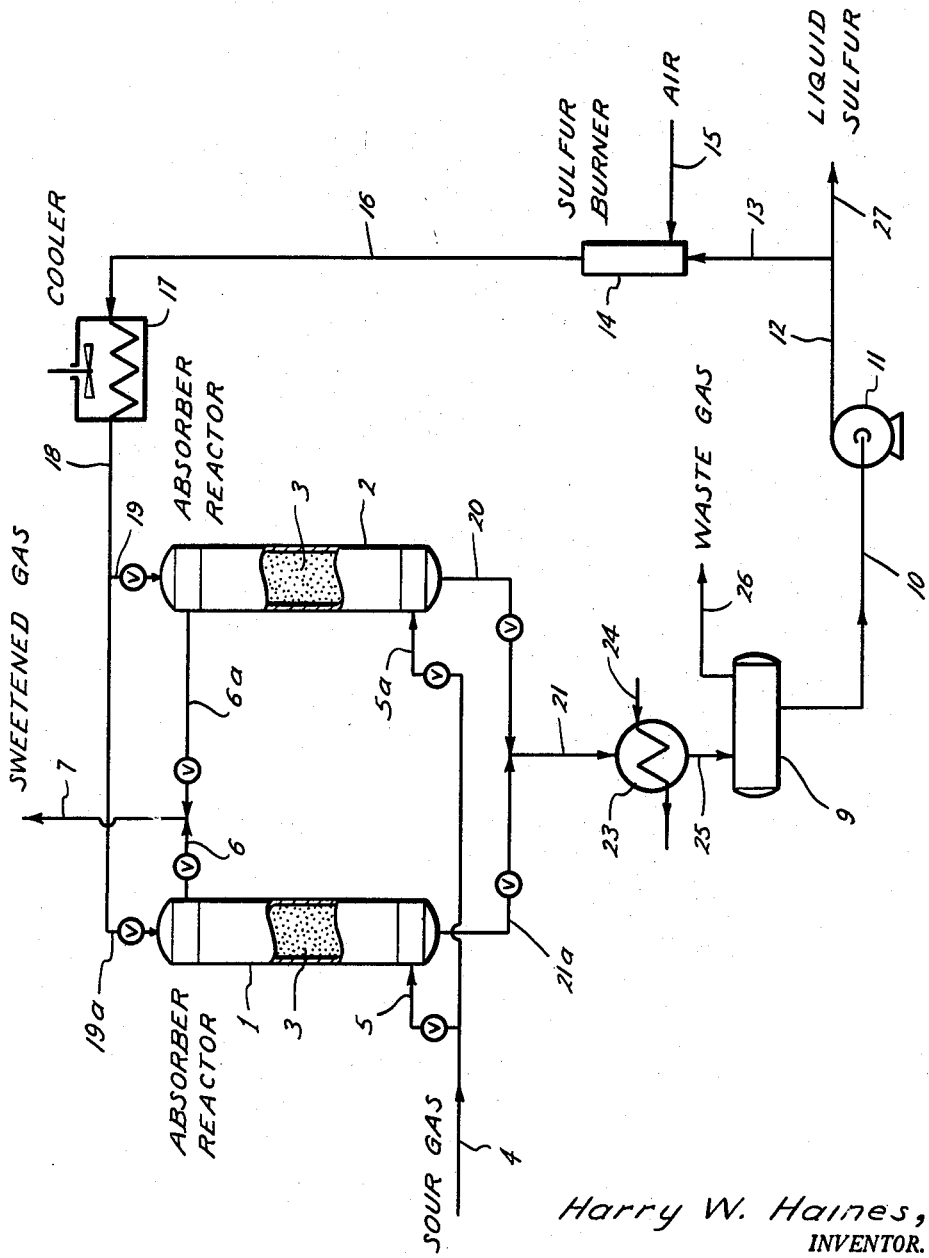

3,144,307
PROCESS FOR THE SELECTIVE ADSORPTION OF HYDROGEN SULFIDE AND ITS SUBSEQUENT CATALYTIC CONVERSION TO ELEMENTAL SULPHUR
Harry W. Haines, Jr., Houston, Tex., assignor, by mesne assignments, to Sulphur Recovery, Inc.
Filed May 23, 1960, Ser. No. 31,185
9 Claims. (Cl. 23—225)

This invention relates to the recovery of elemental sulphur from hydrogen sulphide containing gases, particularly from natural gas, refinery gases, and the like.

Numerous processes have heretofore been employed for recovering sulphur from gases containing sulphur-bearing compounds, and particularly hydrogen sulphide. These processes ordinarily require two-stage operations. In one stage, the hydrogen sulphide is removed from the gas, usually by absorption in a liquid absorbent. In a second stage, the hydrogen sulphide is treated by processes designed to produce elemental sulphur therefrom. Some of these prior art processes involved liquid-phase operations; some vapor phase; and some are combinations of both.

One of the more widely used methods for recovering hydrogen sulphide from gases containing the same comprises treatment of the gas with a liquid alkanolamine absorbent which selectively absorbs the hydrogen sulphide and thereby extracts it from the gas. This is the well-known Girbotol gas purification process. To obtain the elemental sulphur from the hydrogen sulphide, the latter must be stripped from the absorbent by conventional methods and the so-separated hydrogen sulphide is then subjected to reaction by the well-known Claus process to convert the hydrogen sulphide to elemental sulphur and water. The Claus process is ordinarily effected in the vapor phase at elevated temperatures by reacting the hydrogen sulphide in the presence of a suitable catalyst with sulphur dioxide or oxygen, or both. This process is, itself, usually conducted in two stages.

Still other methods of recovery of sulphur from gases, such as the sour gases produced from oil and gas fields or from refineries, comprises, absorbing the hydrogen sulphide in water and then contacting the water solution with a water solution of sulphur dioxide, the resulting reaction producing elemental sulphur and additional water.

All of the prior art processes necessarily involve rather extensive and complicated assemblages of apparatus which are subject to many difficulties arising from the particular process. In particular, these processes create serious corrosion problems in the apparatus; produce sludge; require excessive quantities of utilities, such as water, steam, fuel, and the like. Also, many of these processes are relatively uneconomic when applied to gases carrying relatively small quantities of hydrogen sulphide or to relatively small volumes of gases.

The present invention has for its primary object the provision of a process for the production of elemental sulphur from hydrogen sulphide containing gases by a process which obviates the various above-mentioned disadvantages of more conventional processes, and which is simple, highly efficient, and exceptionally economical with respect to equipment, material and operating costs.

In accordance with the present invention, the process comprises extracting the hydrogen sulphide from gases containing the same by contacting the gases with a solid adsorbent, which is a so-called "molecular sieve," thereafter de-sorbing the bed with a stream of heated gases containing sulphur dioxide or oxygen, or both, to directly react with the de-sorbed hydrogen sulphide in the presence of the molecular sieve as a catalyst to produce elemental sulphur therefrom.

"Molecular Sieves" comprise synthetic solid adsorbents manufactured from materials and under conditions which produce porous solids having voids or pore spaces of specific and substantially uniform size. By passing gases of mixed composition through molecular sieves having voids of selected dimensions, the adsorbent will effectively sieve from the gas stream only those molecules of a size small enough to enter the pores, all other molecules of larger sizes being rejected by the adsorbent. The extracted molecules will be adsorbed on the walls of the pores and may be de-sorbed therefrom by suitable de-sorbing means. Thus, by selecting a suitable molecular sieve, hydrogen sulphide molecules may be effectively sieved from a stream of hydrocarbon gases containing the hydrogen sulphide. The latter will be adsorbed or collected on the body of the adsorbent and thereby separated from the other materials comprising the gas stream, which may then be vented from the process.

The method of manufacture and the properties and characteristics of molecular sieves are fully described in U.S. Patents Nos. 2,882,243 and 2,882,244. The molecular sieves described in these patents comprise alkali metal aluminosilicates which are quite similar in chemical composition to naturally occurring zeolites, as well as other natural clays and feldspars, but are, of course, quite different in physical structure.

Such zeolite-like molecular sieves of selected pore size, will effectively extract hydrogen sulphide from a mixed gas stream, and I have further found that this same type of molecular sieve may also be employed as Claus process catalysts for effecting conversion of the hydrogen sulphide to elemental sulphur. This latter conversion may be accomplished by passing a heated gas stream containing oxygen or sulphur dioxide, or both, through the molecular sieve having the hydrogen sulphide adsorbed therein. This procedure serves both to de-sorb the hydrogen sulphide from the molecular sieve and contemporaneously or simultaneously to effect conversion, in situ, of the hydrogen sulphide to elemental sulphur. The latter, in vapor phase in the reaction gas stream, is then discharged from the reactor and with appropriate cooling, may be recovered in liquid form as a product of the process.

With the procedure in accordance with this invention, apparatus requirements are greatly reduced since the adsorber serves also as the converter or reactor. Accordingly, the adsorption of hydrogen sulphide and its conversion to elemental sulphur may be conducted by successive operations in the same vessel.

The process in accordance with this invention produces exceptionally high yields of elemental sulphur of the highest purity at minimum cost, and with the employment of comparatively simple and relatively inexpensive equipment installations, and with exceptionally low requirements for power and other utilities.

In its simplest form, the process, in accordance with the present invention, comprises the steps of passing the hydrogen sulphide-containing gas through a bed composed of an appropriate molecular sieve to effect extraction of hydrogen sulphide. The desulphurized gas then goes to suitable disposal, as for fuel gas, or the like. The reaction gas, which may, as noted, comprise oxygen, or sulphur dioxide, or both, may be obtained by burning some of the hydrogen sulphide or the product sulphur with air, and passing the resulting hot gas stream containing oxygen and/or sulphur dioxide through the bed of the molecular sieve containing the adsorbed hydrogen sulphide. The gas stream passing through the bed of the molecular sieve material removes the hydrogen sulphide from the bed and contemporaneously reacts with the hydrogen sulphide, the molecular sieve acting as the catalyst for the reaction to produce elemental sulphur and water. By appropriate control of the temperatures, the reactions are conducted in the vapor phase and at maximum efficiency. The effluent gas carrying the elemental sulphur will be cooled to a temperature at which the sulphur liquefies and will be maintained at a temperature preferably 280° to 300° F. at which the viscosity of the liquid sulphur is at a minimum. The liquid sulphur is then separated from the gaseous product of the reaction and delivered to storage.

The de-sorption of the molecular sieve bed, as described, serves to regenerate the sieve for extraction of additional quantities of hydrogen sulphide from further quantities of gases containing the same.

While the process in accordance with this invention may be conducted using a single vessel for conducting both the extraction of the hydrogen sulphide and the following de-sorption and conversion reactions, it will be evident that the process lends itself most readily to the use of at least two adsorption-conversion vessels, arranged in parallel and suitably manifolded, so that while one vessel is functioning as an adsorber for hydrogen sulphide, the other is functioning in the de-sorbing conversion cycle. Thus, the process can be carried on continuously with a minimum amount of apparatus and with maximum efficiency.

The various other objects and advantages of this invention will become more readily apparent from the following description when read in conjunction with the accompanying drawing which comprises a diagrammatic flow sheet for the process in accordance with one useful embodiment of this invention.

As illustrated in the flow sheet, the apparatus includes a pair of vessels 1 and 2 suitably manifolded to serve alternately as adsorbers and as reactors. Each of the vessels has supported therein a bed of a suitable molecular sieve 3, particularly one having the pore space or void characteristics which will function to selectively remove hydrogen sulphide from gas carrying the same, and which will also have the chemical composition suitable for a Claus reaction catalyst. Gas containing hydrogen sulphide from any source, such as oil or gas wells, refineries, natural gasoline plants, and the like, will be fed through a header 4 and a valved branch pipe 5 into the bottom of vessel 1 where it is caused to flow through the bed of the molecular sieve and emerge therefrom through the valved pipe 6 into a line 7 leading to storage or to any other suitable disposal of the desulphurized gas. The adsorption of the hydrogen sulphide in vessel 1 will be conducted at ambient atmospheric temperatures, and the gas leaving vessel 1 through pipes 6 and 7 will generally be substantially free of hydrogen sulphide. This operation constitutes the adsorption cycle. At the same time, vessel 2 is being subjected to the stripping and conversion cycle in order to effect recovery of elemental sulphur from the hydrogen sulphide which previously has been collected in the bed of molecular sieve 3 from another batch of the sour gas. A portion of the liquid sulphur product of the process, which has collected in a receiver 9, is withdrawn through a line 10 by a pump 11 and delivered through a line 12 and a branch line 13 to a sulphur burner 14, of any conventional design, where the sulphur is burned with atmospheric air supplied through line 15. The products of combustion, comprising sulphur dioxide, nitrogen and oxygen, are discharged via line 16 through an air cooler 17, which may be a waste heat boiler or the like, where the combustion gases are cooled to a suitable stripping and reacting temperature, ranging generally between 150° to 500° F. These gases leave cooler 17 through a header 18 and are discharged through a valved branch pipe 19 into the upper end of vessel 2 where they supply the heat and physical force effective to initiate stripping of the previously adsorbed hydrogen sulphide from the bed of molecular sieve 3 in this vessel. Concurrently with the stripping action, the oxygen and sulphur dioxide in the stripping gases react with the de-sorbed hydrogen sulphide to produce sulphur vapor and water vapor with the evolution of heat, the molecular sieve material functioning as a catalyst for this reaction. By proper control of the temperature and volume of the gases entering the chamber, the process can be designed to operate auto-thermally. Depending upon the degree of control exercised, the gases leaving chamber 2 through valved pipe 20 will normally have a temperature in the range of from about 450° to about 800° C.

The gases leaving chamber 2 through pipe 20 contain sulphur vapor and water vapor along with the inert nitrogen and pass via a pipe 21 through a heat exchanger 23 where, by exchange with any suitable cooling fluid supplied through a pipe 24, the temperature is reduced to that at which the sulphur will condense to a liquid having a minimum viscosity. This temperature will normally be in the range of about 285° to 300° F. The liquid sulphur, along with the unliquified gases, flows from exchanger 23 into receiver 9, where the liquid sulphur separates from the gaseous matter which discharges from receiver 9 through a pipe 26 to waste or other disposal. The liquid sulphur in excess of that which is burned in burner 14 is delivered to storage by pump 11 through a branch pipe 27.

Flow of the hot reaction gases through vessel 2 for stripping and converting the adsorbed hydrogen sulphide will be continued until all of the hydrogen sulphide has been stripped from the molecular sieve and converted to elemental sulphur and water vapor. By operation of the several valves in the various branch pipes leading to the respective vessels 1 and 2, vessel 2 may now be placed in the adsorption cycle, while vessel 1 is placed in the de-sorption reaction cycle. Thus a valved branch pipe 5a leads from header 4 into the bottom of vessel 2 and a gas discharge line 6a leads from the upper end of this vessel into line 7 to conduct the adsorption cycle in vessel 2. At the same time, a valved branch pipe 19a leads from header 18 into the upper portion of vessel 1 and thence through valved branch pipe 21a to pipe 21 and the following apparatus elements to complete the de-sorption reaction in vessel 1.

The contemporaneous de-sorption of the hydrogen sulphide and the conversion thereof to sulphur will effectively regenerate the bed of molecular sieve which will, however, be at an elevated temperature. Following completion of the de-sorption-conversion operation, the bed of molecular sieve will be cooled to the desired adsorption temperature in any suitable and known manner, as by passing a stream of cool gas or air through the bed until it has been cooled sufficiently.

Molecular sieves which are suitable for use in the present process are manufactured by Union Carbide Corporation and certain of these are sold as "Linde Molecular Sieves" Types 4A, 5A, 13X. Types 4A and 13X are sodium aluminosilicates, while Type 5A is a sodium-calcium aluminosilicate. These sieves have pores and voids which will admit hydrogen sulphide molecules while excluding all larger molecules.

These sieves are exceptionally efficient, selective adsorbents and will remove up to about 98% of the hydrogen sulphide carried by a hydrocarbon gas stream, such as sour natural gas or refinery gas.

In another embodiment of this invention, I have found that an admixture of molecular sieves with conventional Claus catalyst, such as activated bauxite, may also be used for hydrogen sulphide adsorption. The desorption-conversion of hydrogen sulphide from such mixtures may be more effective under some conditions than desorption-conversion of hydrogen sulphide released from molecular sieves alone.

As noted previously, the desorption-reaction gas may be air, sulphur burner gases, or hydrogen sulphide combustion gases, in the presence or absence of water vapor, at temperatures of from about 150° F. to about 500° F. for the combined stripping-conversion step. For example, I may use sulphur burner gas of approximately 7–10% by volume sulphur dioxide, 11–14% by volume oxygen, and 79% by volume nitrogen; or combustion gases derived from burning hydrogen sulphide in air, containing approximately 12.5% by volume sulphur dioxide, 12.5% by volume water vapor, and 75% by volume nitrogen.

All other things being equal, sulphur burner gases or air are preferred over hydrogen sulphide combustion gases because the latter contain larger quantities of water vapor, which tends to suppress conversion of hydrogen sulphide to elemental sulphur.

The process in accordance with this invention may operate automatically or semi-automatically for the production of sulphur from sour gases with only a fraction of the equipment conventionally required for such production; at lower utilities consumption rates; and with maximum recovery efficiency. Because of the small amount of equipment required, plants employing my process may be skid-mounted for economic recovery of sulphur at production rates considerably below 40 tons per day, presently considered to be an economic minimum.

It will be understood that numerous alterations and modifications may be made in the details of the illustrative embodiment of the process of this invention within the scope of the appended claims but without departing from the spirit of this invention.

What I claim and desire to secure by Letters Patent is:

1. A sulphur recovery process, comprising, contacting a hydrocarbon gas stream containing hydrogen sulphide with a molecular sieve for hydrogen sulphide to selectively adsorb said hydrogen sulphide, thereafter de-sorbing the molecular sieve with a stream of gases containing a reactant consisting of sulfur dioxide for converting hydrogen sulphide to elemental sulphur, said molecular sieve comprising a catalyst for the conversion reaction, and conducting the desorption at the hydrogen sulphide conversion temperature whereby to substantially simultaneously de-sorb the molecular sieve of the hydrogen sulphide and to produce elemental sulphur therefrom.

2. A sulphur recovery process according to claim 1 wherein said molecular sieve comprises an alkali metal aluminosilicate.

3. A sulphur recovery process according to claim 1 wherein the de-sorption-conversion temperature is in the range of from about 150° to about 800° F.

4. A sulphur recovery process according to claim 1 wherein the hydrogen sulphide adsorption step is conducted at the ambient atmospheric temperature, and the de-sorption-conversion temperature is in the range of from about 150° F. to about 800° F.

5. In a process according to claim 4, the step of cooling the de-sorbed molecular sieve to said ambient atmospheric temperature.

6. In a process according to claim 4, the steps of cooling the products of the conversion reaction to a sulphur condensing temperature in the range from about 280° F. to about 320° F., and separating the liquid sulphur from the other products of the reaction.

7. A sulphur recovery process, comprising, contacting a hydrocarbon gas stream containing hydrogen sulphide with a molecular sieve for hydrogen sulphide to selectively adsorb said hydrogen sulphide, thereafter de-sorbing the molecular sieve with a stream of gases containing a reactant consisting of sulfur dioxide for converting hydrogen sulphide to elemental sulphur, said molecular sieve comprising a catalyst for the conversion reaction, conducting the de-sorption at the hydrogen sulphide conversion temperature whereby to substantially simultaneously de-sorb the molecular sieve of the hydrogen sulphide and to produce elemental sulphur therefrom, separating the produced sulphur from the de-sorption-conversion products, burning a portion of the separated sulphur in atmospheric air to produce said stream of gases containing said reactant, cooling said stream of gases to said conversion temperature, and directing the cooled stream of gases into contact with a body of said molecular sieve having hydrogen sulphide adsorbed therein.

8. A sulphur recovery process according to claim 7 wherein said molecular sieve comprises an alkali metal aluminosilicate.

9. A sulfur recovery process according to claim 7 wherein the hydrogen sulfide adsorption step is conducted at ambient atmospheric temperature, and the desorption-conversion temperature is in the range of from about 150° F. to about 500° F.

References Cited in the file of this patent

UNITED STATES PATENTS

| 1,317,583 | Leamon | Sept. 30, 1919 |
| 2,771,964 | Miller | Nov. 27, 1956 |
| 2,882,243 | Milton | Apr. 14, 1959 |
| 2,971,824 | Johnson et al. | Feb. 14, 1961 |

OTHER REFERENCES

Ser. No. 362,376, Koppers (A.P.C.), published April 27, 1943.